(12) United States Patent
Donnick

(10) Patent No.: US 8,329,073 B2
(45) Date of Patent: Dec. 11, 2012

(54) VARIABLE-ORIFICE PRILL PLATE

(75) Inventor: David Wayne Donnick, Midlothian, VA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/150,699

(22) Filed: Jun. 1, 2011

(65) Prior Publication Data
US 2012/0001355 A1   Jan. 5, 2012

Related U.S. Application Data

(60) Provisional application No. 61/360,082, filed on Jun. 30, 2010.

(51) Int. Cl.
*B29B 9/10* (2006.01)
(52) U.S. Cl. .............................. 264/13; 425/6
(58) Field of Classification Search .............. 264/13; 425/6
See application file for complete search history.

(56) References Cited

U.S. PATENT DOCUMENTS

| | | | |
|---|---|---|---|
| 3,048,887 | A | 8/1962 | Weiland |
| 3,100,698 | A | 8/1963 | Horsley et al. |
| 3,323,166 | A | 6/1967 | Ross |
| 4,107,382 | A | 8/1978 | Augustine et al. |
| 4,394,150 | A | 7/1983 | Garrison, Jr. et al. |
| 4,776,493 | A | 10/1988 | Tegel |
| 4,858,552 | A | 8/1989 | Glatt et al. |
| 5,403,176 | A | 4/1995 | Bruckmann et al. |
| 5,901,886 | A | 5/1999 | Grindstaff et al. |
| 6,695,991 | B1 | 2/2004 | Lanze et al. |
| 7,175,684 | B1 | 2/2007 | Kweeder et al. |
| 7,226,553 | B2 | 6/2007 | Jackson et al. |
| 2002/0182280 | A1 | 12/2002 | Northup et al. |

FOREIGN PATENT DOCUMENTS

| | | |
|---|---|---|
| EP | 2 008 709 A1 | 12/2008 |
| GB | 1 489 922 | 10/1977 |

*Primary Examiner* — Mary F Theisen
(74) *Attorney, Agent, or Firm* — Faegre Baker Daniels LLP

(57) ABSTRACT

Prill heads having prilling assemblies that include adjustable openings. Prilling methods using the prilling assemblies can allow for the size of the openings to be varied during processing to alter the size of the prills as desired, or for clogged openings to be cleared, while maintaining operation of the prilling process. The prilling assemblies and prilling methods can be used to produce fertilizer products, including fertilizers comprising ammonium sulfate nitrate.

19 Claims, 5 Drawing Sheets

# VARIABLE-ORIFICE PRILL PLATE

RELATED APPLICATIONS

This application claims the benefit of U.S. Provisional Application Ser. No. 61/360,082, filed Jun. 30, 2010, currently pending, the disclosure of which is hereby incorporated by reference in its entirety.

FIELD OF THE INVENTION

The present technology relates to prilling processes, and in particular to a prilling apparatus and method utilizing an adjustable prill plate that provides openings of variable size.

DESCRIPTION OF RELATED ART

Prilling is a process by which solid particles are formed in an open tower via solidification as droplets fall from a prill head. Prilling is distinguished from spray drying by its near-complete or complete lack of volatile solvent. A prill head is the apparatus at the top of a prill tower which divides the molten material into the streams from which the prills form.

Current prilling operations utilize prilling plates that have only one size of opening in the prill head through which the molten material passes from the prill head into the prilling tower. If it is desired to change the size of the opening, the prilling operation is generally shut down so that prill plates having openings of a different size can be installed onto the prill head. Likewise, if openings in the prill plate become clogged by the molten material, operations generally have to be shut down to allow the prill plates to be cleaned and unclogged.

SUMMARY OF THE INVENTION

The present technology provides prilling assemblies and prilling methods that include a movable prill plate that allows adjustment of the size of the pathways through which a molten material passes to exit a prill head.

In one aspect, a prilling assembly is provided that includes a stationary prill plate having a plurality of orifices, and a movable prill plate adjacent to the stationary prill plate, the movable prill plate having a plurality of orifices that align with the orifices of the stationary prill plate to form pathways through the prilling assembly when the movable prill plate is in an open position.

In another aspect, a prilling method is provided that includes providing a prill head comprising a prilling assembly having a stationary prill plate and a movable prill plate adjacent to the stationary prill plate, the movable prill plate and the stationary prill plate each having a plurality of orifices that align to form pathways having a cross-sectional size; operating the prill head by passing a molten material through the pathways of the prilling assembly; and moving the movable prill plate with respect to the stationary prill plate to change the cross-sectional size of the pathways.

BRIEF DESCRIPTION OF THE DRAWINGS

Specific examples have been chosen for purposes of illustration and description, and are shown in the accompanying drawings, forming a part of the specification.

DETAILED DESCRIPTION

The prilling assemblies and methods of the present technology can be used in any suitable prilling application, including but not limited to the production of fertilizer products, such as fertilizer products that comprise ammonium sulfate nitrate.

Figure 1:
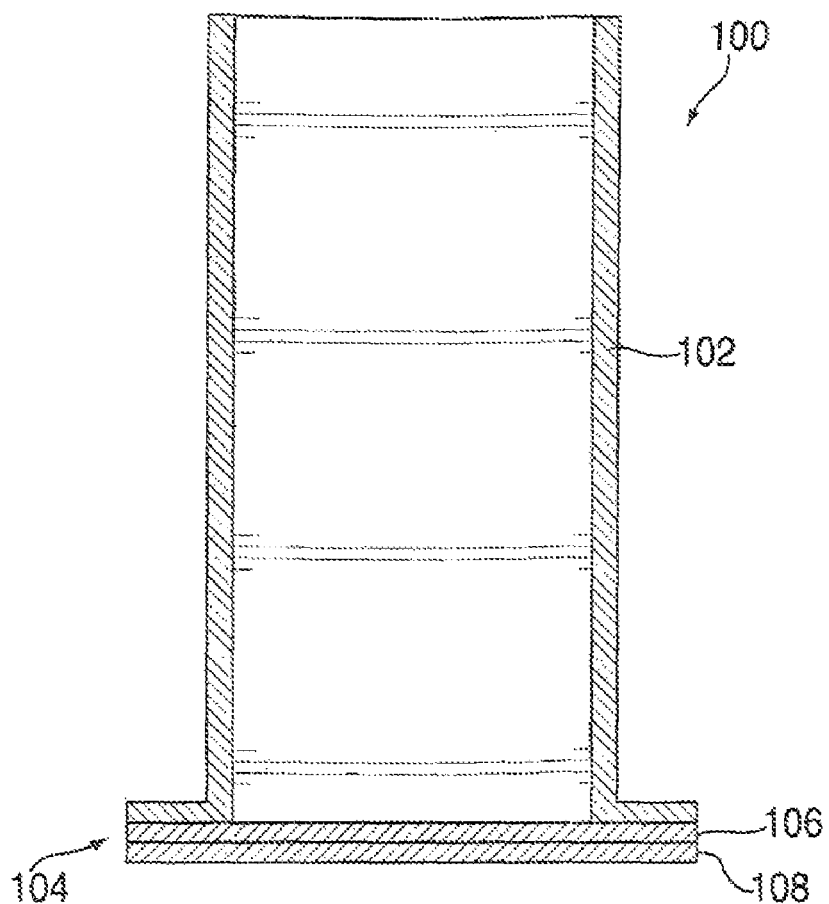
FIG. 1 illustrates one example of a prill head of the present technology.

FIG. 1 shows a vertical cross section through the center of an open-topped, prill head 100. The prill head 100 includes a sidewall 102 and a prilling assembly 104. The sidewall 102 can form any suitable shape, such as a cylinder, oval, ellipse, triangle, square, rectangle, or a polygon. The prilling assembly 104 can be connected to the bottom end of the sidewall 102, and can include a first prill plate 106 and a second prill plate 108.

Figure 2:
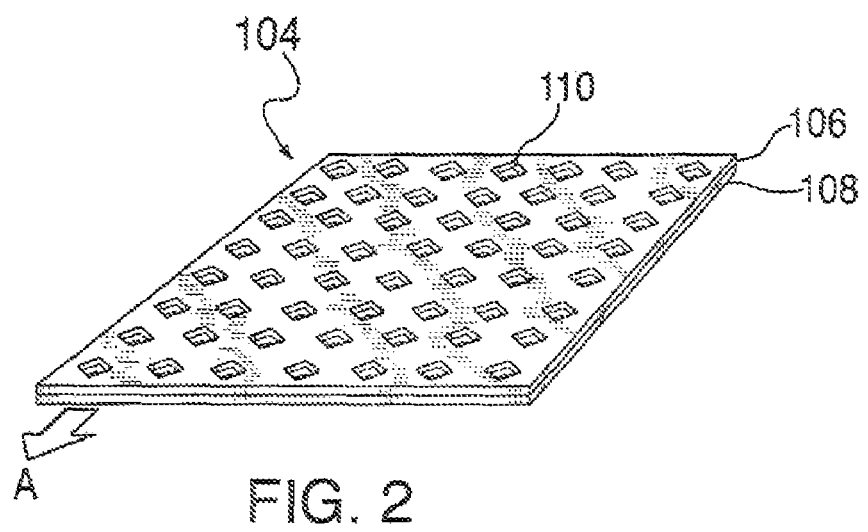
FIG. 2 illustrates one example of a prilling assembly of the present technology.

FIG. 2 shows one example of a prilling assembly 104 that can be used in a prill head 100 of FIG. 1. One of the prill plates of the prilling assembly 104 can be a stationary prill plate, while the other can be a movable prill plate. As illustrated in FIG. 1, the first prill plate 106 is a stationary prill plate, and the second prill plate 108 is a movable prill plate. The stationary prill plate 106 and the movable prill plate 108 can be immediately adjacent to each other, having a space between the prill plates 106 and 108 that is zero or as close to zero as reasonable practicable. The movable prill plate 108 can be operatively connected to a driving mechanism (not shown), such as a piston or a servo motor, that can control the movement and position of the movable prill plate 108.

A stationary prill plate and a movable prill plate of the present technology can each have a plurality of orifices that pass through the prill plate from a top surface to a bottom surface of the prill plate. For example, referring to FIGS. 1 and 2, the stationary prill plate 106 and the movable prill plate 108 can each have a plurality of orifices 110. The orifices 110 can be laid out in any suitable pattern having the plurality of orifices 110 spaced apart along the length and width of the prill plate. The orifices 110 of the stationary prill plate 106 and the movable prill plate 108 are preferably identical, or at least substantially identical, in shape and pattern, and are preferably in alignment to create fully open pathways through the prill plates 106 and 108 when the movable prill plate 108 is in an open position relative to the stationary prill plate 106. The size of the pathways can be reduced, or the pathways can be closed completely, by moving the movable prill plate 108 to bring the orifices 110 of the movable prill plate 108 out of alignment with the orifices 110 of the stationary prill plate 106, thus reducing the effective diameter and cross sectional area of the orifice. The orifices 110 can have any suitable shape, but preferably have a shape, such as a square, where the cross sectional shape remains constant as the effective diameter is reduced. Alternative examples of prilling assemblies having a stationary prill plate and a movable prill plate that operate in this manner are described below with reference to FIGS. 3 through 9.

Referring to the specific example illustrated in FIGS. 1 and 2, the stationary prill plate 106 can be square or rectangular in shape, and the movable prill plate 108 can also be square or rectangular in shape. Preferably, each of the orifices 110 of both prill plates can be square in shape, and can be laid out in any suitable pattern having the plurality of orifices 110 spaced apart along the length and width of the prill plate such that the diagonals of all of the square orifices are aligned parallel to a common direction. For example, the pattern can preferably include the square orifices 110 being spaced equally and arranged in lines collinear to the diagonals of the square orifices 110, with the lines of orifices 110 alternating such that every other line of orifices is offset parallel to the line by some distance, preferably half the distance between adjacent orifices 110 along the lines. When the movable prill plate is aligned with the stationary prill plate in an open position as shown in FIG. 2, the orifices 110 on each prill plate are in alignment to create fully open pathways through the prilling assembly. The pathways have a square cross-section that have an initial size equal to that of the orifices 110. The effective diameter, and thus also the cross-sectional size, of the pathways can be reduced, while still maintaining a square shape, by moving the movable prill plate 108 in a direction A that is parallel to the diagonals of the orifices 110.

During operation of a prill head 100 in a prill tower, the movable prill plate can be placed in its first position, in which the cross-sectional size of the pathways is the largest because the orifices of the movable prill plate are aligned with those of the stationary prill plate. Alternatively, the movable prill plate can be moved to an operating position that is not its first position, in order to create pathways of a desired cross-sectional size. A molten material, such as fertilizer material, can then be passed from the prill head into the prilling tower by providing the molten material to the prill head and passing the molten material through the pathways in the prilling assembly. The movable prill plate 108 can be moved to change the cross-sectional size of the pathways, and thus adjust the particle size of the resulting prills without shutting down, or to maintain a constant particle size by adjusting the prill plate openings to compensate for changes in the material being prilled, such as temperature.

Additionally, the material being prilled can sometimes clog one or more pathways in a prilling assembly, creating a plug and reducing the efficiency of the prilling head. In such instances, the clogs can be cleared without shutting down operations by moving the movable plate 108 from an operating position to a closed position in which the pathways are closed, waiting a desired period of time to allow pressure to build-up in the prill head 100, and then moving the movable prill plate rapidly to its first position in which the orifices in the stationary plate 106 and movable plate 108 are in complete alignment to reopen the pathways. The movable prill plate 108 can then be moved back to an operating position. Preferably, the amount of pressure allowed to build-up is sufficient to push the clogs out of the reopened pathways, and the movement of the movable plate 108 can also facilitate loosening or breaking-up of clogs within the pathways.

FIGS. 3 through 9 illustrate alternative configurations of prilling assemblies that include a stationary plate and a movable plate.

Figure 3:
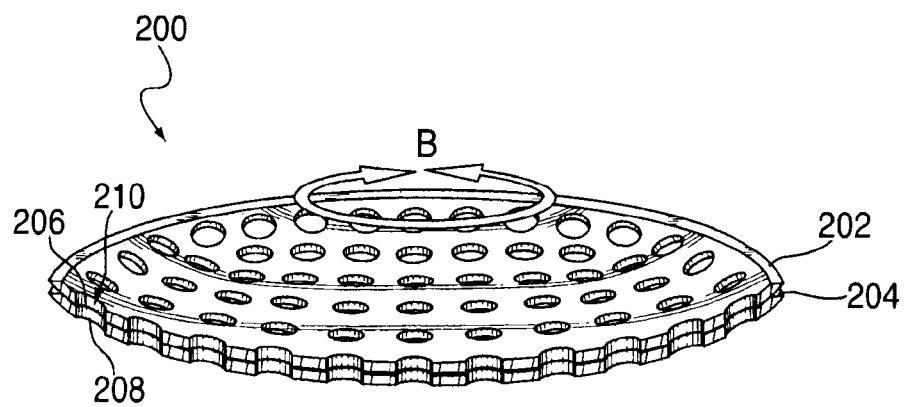
FIG. 3 illustrates a second example of a prilling assembly of the present technology.

FIG. 3 shows a prilling assembly 200 that includes a stationary prill plate 202 and a movable prill plate 204 that have a circular cross-section and can be convex with respect to the sidewall 102 of the prill head 100. The stationary prill plate 202 has a plurality of orifices 206. The movable prill plate 204 has a plurality of orifices 208 that can align with the orifices 206 of the stationary prill plate 202 to form pathways 210. The orifices can be any suitable shape, such as the circular orifices in the illustrated example. In a preferred example, the orifices can be square, such as the orifices illustrated in FIG. 1. The orifices 208 can be laid out in any suitable pattern, such as having the plurality of orifices 208 spaced apart along concentric circles centered on the axis of rotation of the movable prill plate 204, such that the midpoints of the diagonals of the orifices 208 are tangent to one of the concentric circles. The movable prill plate 204 can be rotated clock-wise or counter-clockwise in the direction B to change the cross-sectional size of the pathways 210.

Figure 4:
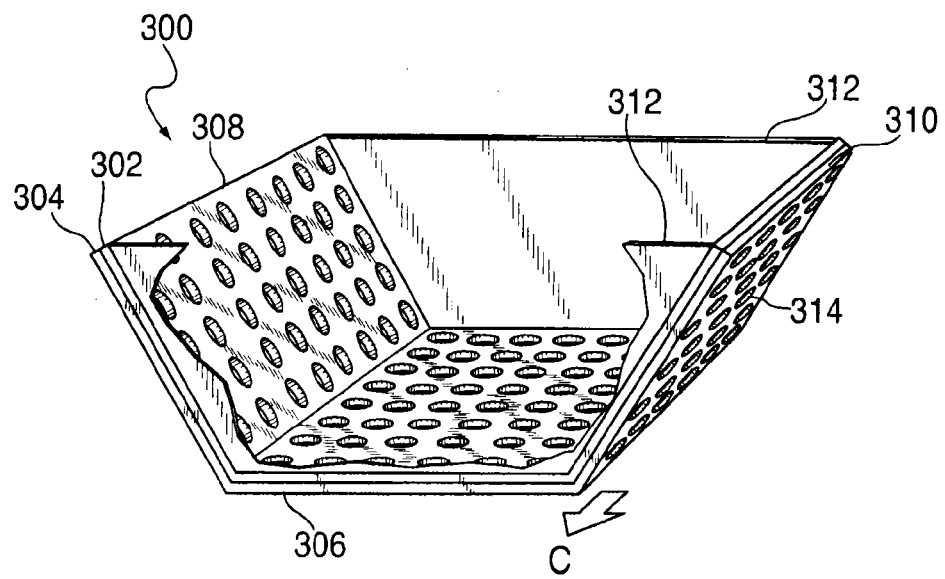
FIG. 4 illustrates a third example of a prilling assembly of the present technology.

FIG. 4 shows a prilling assembly 300 that includes a stationary prill plate 302 and a movable prill plate 304. The stationary prill plate 302 and the movable prill plate 304 can each have a bottom 306, a first sidewall 308 and a second sidewall 310. The bottoms 306, first sidewalls 308 and second sidewalls 310 of the prill plates 302 and 304 can each include a plurality of orifices 314 that can align to form pathways through the prilling assembly 300. The stationary prill plate 302 can also include two end walls 312, which can be vertical, or a least substantially vertical. The movable prill plate 304 can be moved horizontally in the direction C to change the cross-sectional size of the pathways formed by the orifices 314.

Figure 5:
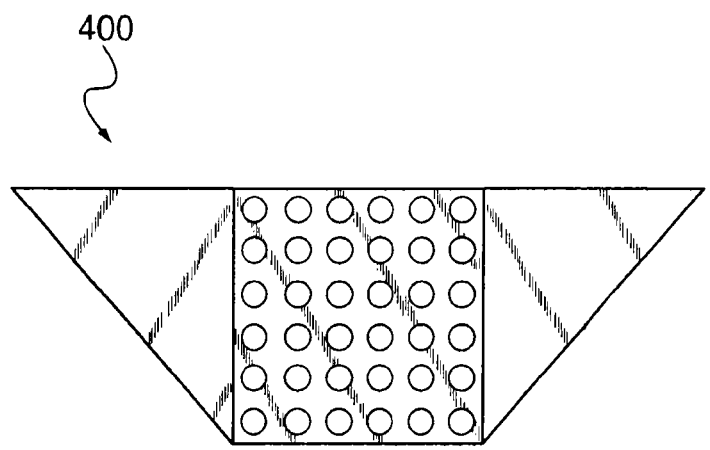
FIG. 5 illustrates a side view of a fourth example of a prilling assembly of the present technology.
Figure 6:
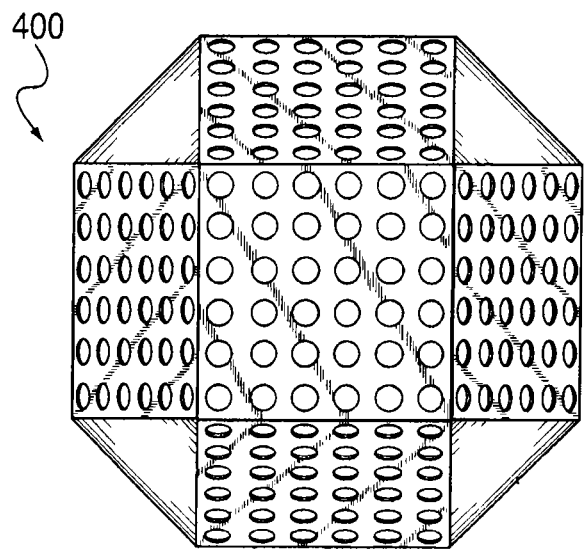
FIG. 6 illustrates a bottom view of the prilling assembly of FIG. 5.

FIGS. 5 and 6 show a side view and bottom view, respectively, of a prilling assembly 400 that forms the shape of a truncated pyramid.

Figure 7:
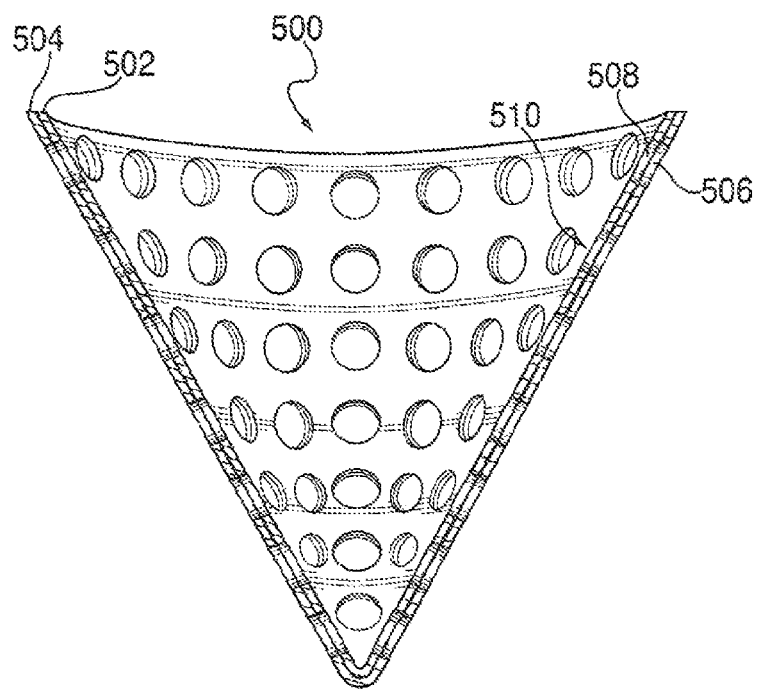
FIG. 7 illustrates a side view of a fifth example of a prilling assembly of the present technology.
Figure 8:
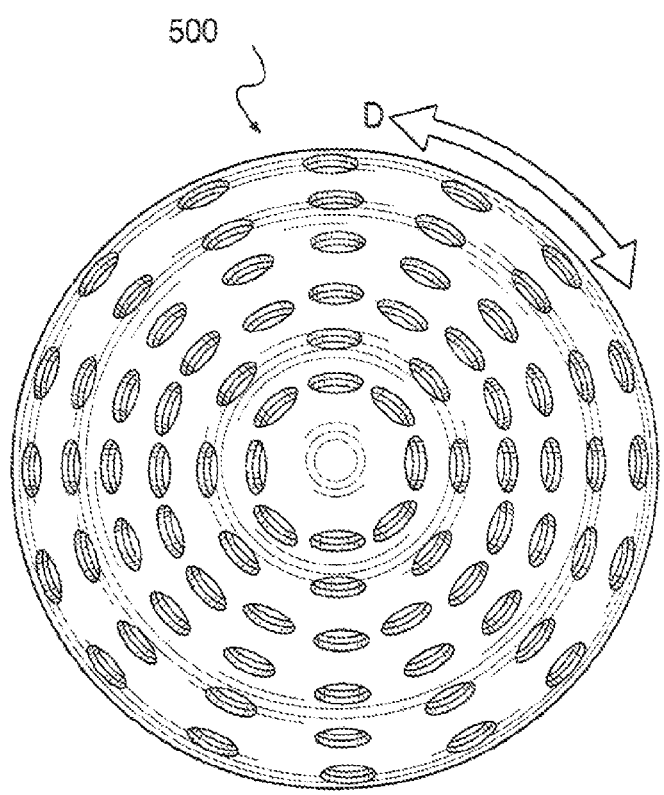
FIG. 8 illustrates a bottom view of the prilling assembly FIG. 7.

FIGS. 7 and 8 show a side view and bottom view, respectively, of a prilling assembly 500 that forms the shape of a circular cone. The prilling assembly 500 includes a stationary prill plate 502 and a movable prill plate 504. The stationary prill plate 502 has a plurality of orifices 506. The movable prill plate 504 has a plurality of orifices 508 that can align with the orifices 506 of the stationary prill plate 502 to form pathways 510. The movable prill plate 504 can be rotated clock-wise or counter-clockwise in the direction D to change the cross-sectional size of the pathways 510.

Figure 9:
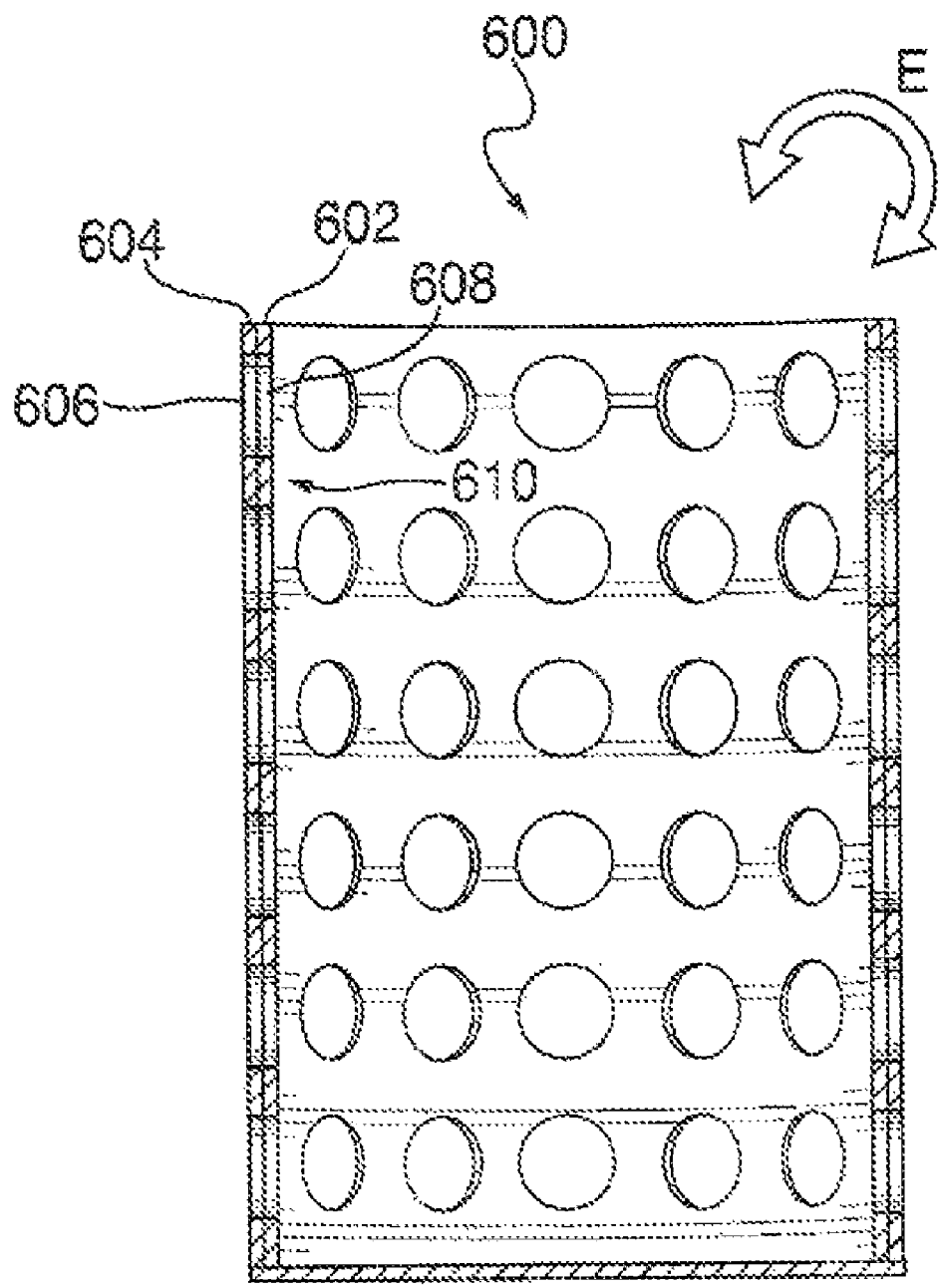
FIG. 9 illustrates a sixth example of a prilling assembly of the present technology.

FIG. 9 shows a side view through the center of a prilling assembly 600 that forms a cylinder. The prilling assembly 600 includes a stationary prill plate 602 and a movable prill plate 604. The stationary prill plate 602 has a plurality of orifices 606. The movable prill plate 604 has a plurality of orifices 608 that can align with the orifices 606 of the stationary prill plate 602 to form pathways 610. The movable prill plate 604 can be rotated clock-wise or counter-clockwise in the direction E to change the cross-sectional size of the pathways 610.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A prilling assembly comprising:
a stationary prill plate having a plurality of orifices; and
a movable prill plate adjacent to the stationary prill plate, the movable prill plate having a plurality of orifices that align with the orifices of the stationary prill plate to form pathways through the prilling assembly when the movable prill plate is in an open position.

2. The prilling assembly of claim 1, wherein the movable prill plate is configured and constructed to move in a sliding manner with respect to the stationary prill plate.

3. The prilling assembly of claim 1, wherein the orifices of the stationary prill plate and the movable prill plate are substantially identical in shape and pattern.

4. The prilling assembly of claim 3, wherein the orifices of the stationary prill plate and the movable prill plate are square in shape.

5. The prilling assembly of claim 4, wherein the movable prill plate is configured to move in a direction parallel to the diagonals of the orifices of the stationary prill plate.

6. The prilling assembly of claim 1, wherein the stationary prill plate and the movable prill plate are square or rectangular in shape.

7. The prilling assembly of claim 1, wherein the stationary prill plate and the movable prill plate each comprise a circular cross-section and are convex with respect to the sidewall of the prill head.

8. The prilling assembly of claim 1, wherein the stationary prill plate and the movable prill plate each comprise a bottom, a first sidewall, and a second sidewall, and the stationary prill plate further comprises two end walls that are at least substantially vertical.

9. The prilling assembly of claim 1, wherein the stationary prill plate and the movable prill plate form a circular cone or a cylinder.

10. A prilling method comprising the steps of:
providing a prill head comprising a prilling assembly having a stationary prill plate and a movable prill plate adjacent to the stationary prill plate, the movable prill plate and the stationary prill plate each having a plurality of orifices that align to form pathways having a cross-sectional size;
operating the prill head by passing a molten material through the pathways of the prilling assembly; and
moving the movable prill plate with respect to the stationary prill plate to change the cross-sectional size of the pathways.

11. The prilling method of claim 10, wherein clogs in the pathways can be cleared by:
moving the movable plate from an operating position to a closed position in order to close the pathways; waiting a desired period of time to allow pressure to build-up in the prill head;
moving the movable prill plate to an open position such that the orifices in the stationary plate and movable plate are in complete alignment to reopen the pathways; and
moving the movable prill plate back to the operating position.

12. The prilling method of claim 10, wherein the movable prill plate is configured and constructed to move in a sliding manner with respect to the stationary prill plate.

13. The prilling method of claim 10, wherein the orifices of the stationary prill plate and the movable prill plate are substantially identical in shape and pattern.

14. The prilling method of claim 10, wherein the orifices of the stationary prill plate and the movable prill plate are square in shape.

15. The prilling method of claim 14, wherein the movable prill plate is configured to move in a direction parallel to the diagonals of the orifices of the stationary prill plate.

16. The prilling method of claim 10, wherein the stationary prill plate and the movable prill plate are square or rectangular in shape.

17. The prilling method of claim 10, wherein the stationary prill plate and the movable prill plate each comprise a circular cross-section and are convex with respect to the sidewall of the prill head.

18. The prilling method of claim 10, wherein the stationary prill plate and the movable prill plate a each comprise a bottom, a first sidewall, and a second sidewall, and the stationary prill plate further comprises two end walls that are at least substantially vertical.

19. The prilling method of claim 10, wherein the stationary prill plate and the movable prill plate form a circular cone or a cylinder.

* * * * *